United States Patent [19]

Moody et al.

[11] Patent Number: 5,489,246
[45] Date of Patent: Feb. 6, 1996

[54] ELECTRONIC PARK LOCK

[75] Inventors: John W. Moody, Clarkston; C. Robert Brandt, Brighton; Lawrence A. Wiltfang; Steve Hojnacki, both of Clarkston, all of Mich.

[73] Assignee: Pontiac Coil, Inc., Waterford, Mich.

[21] Appl. No.: 297,387

[22] Filed: Aug. 29, 1994

[51] Int. Cl.⁶ .................................... B60K 41/28
[52] U.S. Cl. .................. 477/96; 192/4 A; 477/99
[58] Field of Search .................... 477/96, 99; 192/4 A

[56] References Cited

U.S. PATENT DOCUMENTS

| | | | |
|---|---|---|---|
| 3,939,939 | 2/1976 | Okazaki | 180/82 |
| 3,960,235 | 6/1976 | Iijima | 180/82 |
| 4,097,833 | 6/1978 | Myers | 335/261 |
| 4,473,141 | 9/1984 | Mochida | 192/1 |
| 4,474,085 | 10/1984 | DeVogelaere | 74/878 |
| 4,513,276 | 4/1985 | Kubota et al. | 340/52 |
| 4,768,610 | 9/1988 | Pagel et al. | 180/271 |
| 4,887,702 | 12/1989 | Ratke et al. | 192/4 |
| 4,947,967 | 8/1990 | Kito et al. | 192/4 |
| 4,986,399 | 1/1991 | Gokee | 192/4 |
| 4,987,968 | 1/1991 | Martus et al. | 180/272 |
| 5,009,295 | 4/1991 | Kinkade et al. | 192/4 |
| 5,018,610 | 5/1991 | Rolinski et al. | 192/4 |
| 5,027,929 | 7/1991 | Ratke et al. | 192/4 |
| 5,027,931 | 7/1991 | Ratke et al. | 192/9 |
| 5,076,114 | 12/1991 | Moody | 74/501.5 |
| 5,078,242 | 1/1992 | Ratke et al. | 192/4 |
| 5,096,033 | 3/1992 | Osborn | 192/4 |
| 5,129,494 | 7/1992 | Rolinski et al. | 192/4 |
| 5,167,308 | 12/1992 | Osborn | 192/4 |
| 5,176,231 | 1/1993 | Moody et al. | 192/4 |
| 5,181,592 | 1/1993 | Pattock | 192/4 |
| 5,251,723 | 10/1993 | Rolinski et al. | 192/4 |
| 5,275,465 | 1/1994 | Ruiter | 74/483 |

*Primary Examiner*—Dirk Wright
*Attorney, Agent, or Firm*—Young, MacFarlane & Wood

[57] ABSTRACT

An electronic transmission shifter interlock system in which an electronic module is mounted directly on a shift lever for pivotal movement therewith. The module contains two electromagnetic devices which operate on the spring-biased, shift lever core rod to control the PARK lock release so as to inhibit and/or enable operation of the shift lever according to the status of the ignition lock and the position of the brake pedal. The interlock module is electrically coupled with the ignition lock to prevent the ignition key from being removed while the shift lever is other than the PARK position.

13 Claims, 4 Drawing Sheets

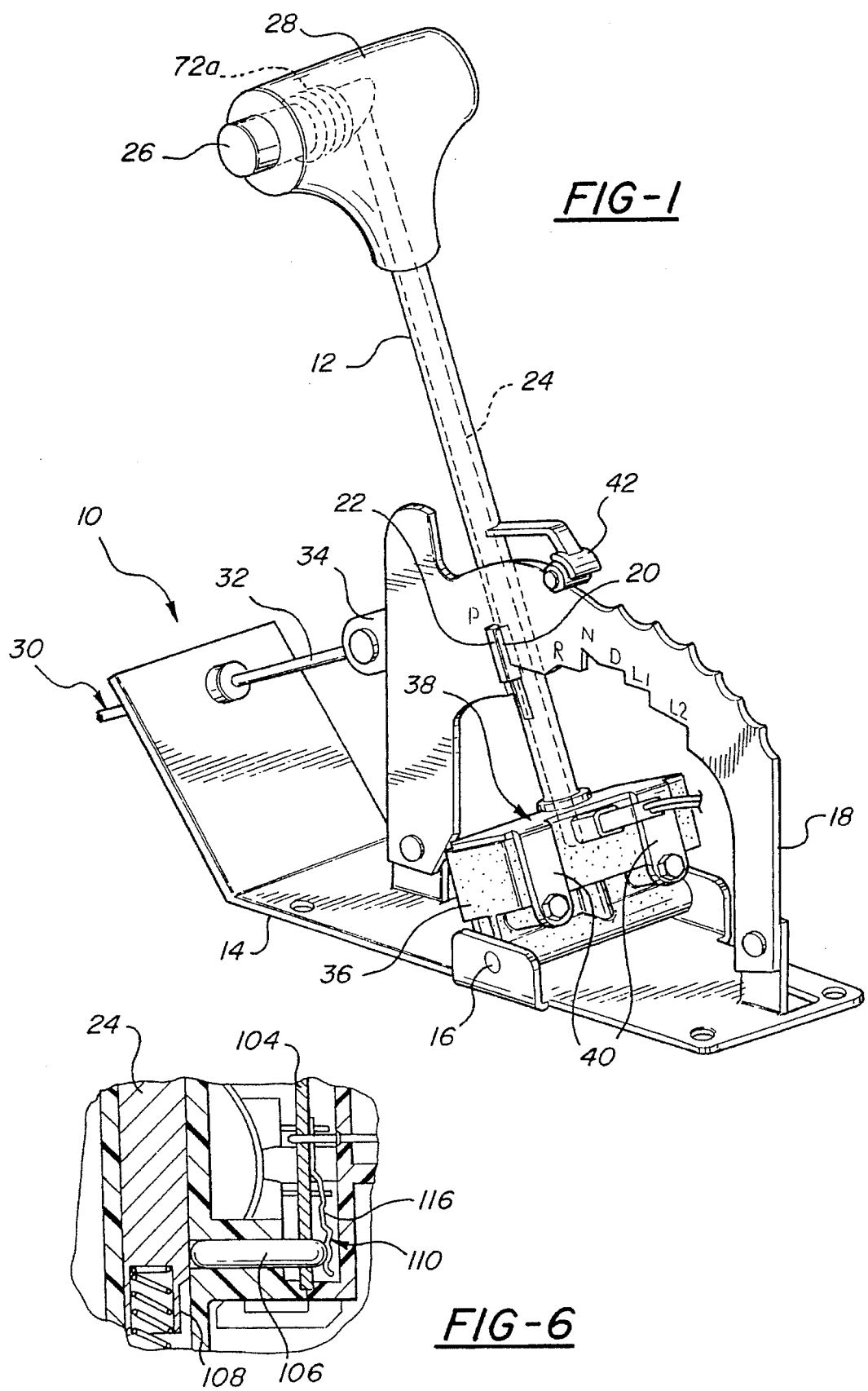

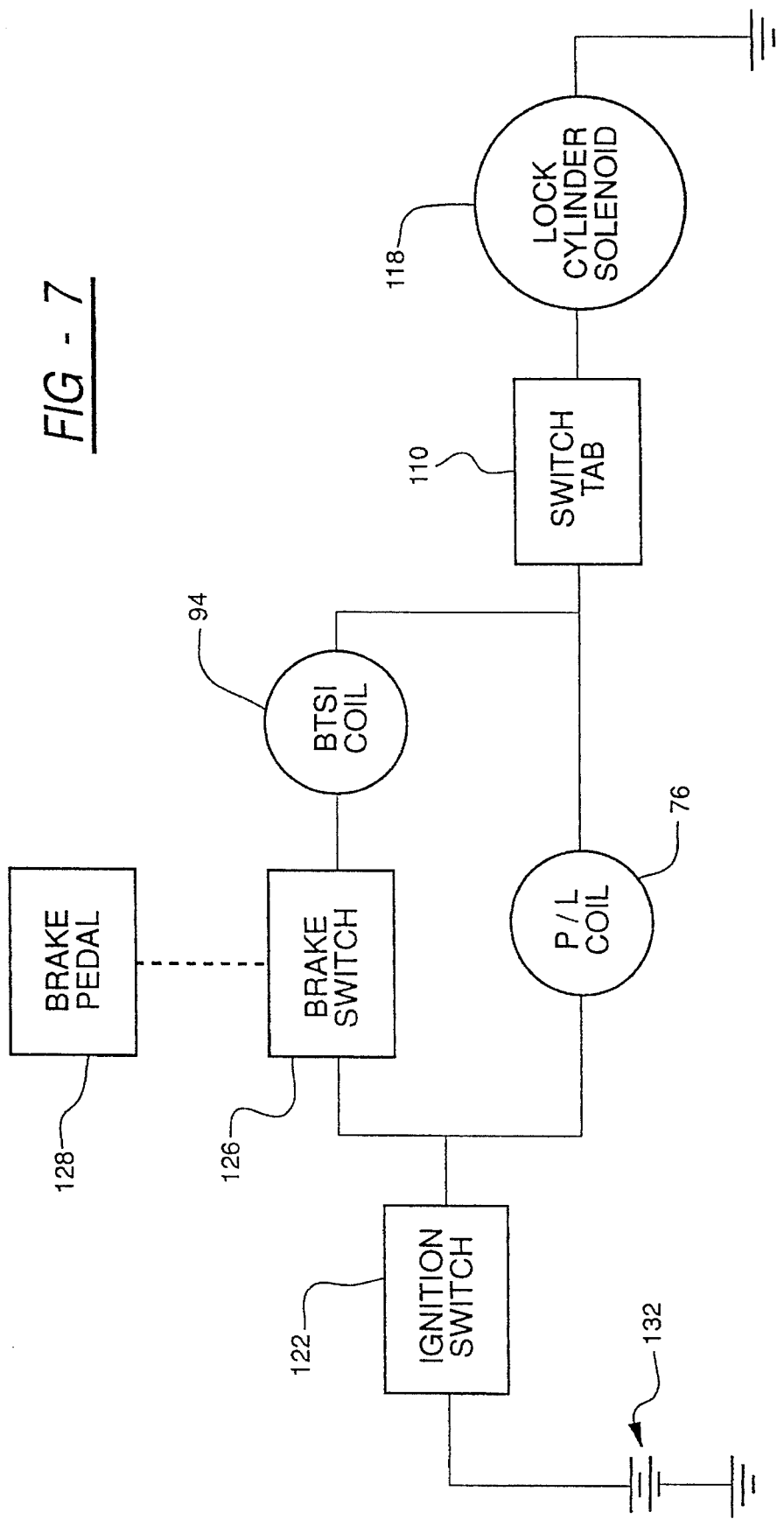

ELECTRONIC PARK LOCK

FIELD OF THE INVENTION

This invention relates to electronic shifter interlocks for automotive vehicles having lever-operated shifters of the type having a release mechanism which must be actuated before the shift lever can be moved from the PARK position. The invention relates more specifically to an all-electronic, multiple function shifter interlock which achieves both traditional park/lock and shifter interlock functions.

BACKGROUND OF THE INVENTION

Automotive vehicles have been manufactured and sold in the United States with each of the following three systems:

(1) a PARK/LOCK which immobilizes the automatic transmission shift lever or the steering wheel of the vehicle, or both, until an ignition key has been inserted into the ignition lock and turned to release the PARK/LOCK;

(2) a shifter interlock, traditionally, but not necessarily, tied into the brake light circuit of the vehicle to immobilize the shift lever for the automatic transmission and prevent its movement from the "PARK" position until the ignition circuit is activated and the brake pedal of the vehicle is depressed; and (3) an ignition key retention means to prevent the ignition lock from being turned from ON to LOCK while the vehicle is being actively driven.

Traditionally, these three systems have been essentially independent of one another. U.S. Pat. No. 4,474,085, issued Oct. 2, 1984 to DeVogelaere et al. and assigned to General Motors Corporation, illustrates a PARK/LOCK in which a cable extends from the ignition key lock to a bell crank associated with the shift lever release mechanism to prevent the release mechanism from being operated until such time as the ignition lock has been unlocked and turned. Shifter interlocks, typically brake/shifter interlocks, have been achieved using solenoids and electromagnets in a variety of ways to prevent operation of either the shift lever release mechanism or the shift lever itself until such time as the brake pedal is depressed to change the energization state of the brake/shifter interlock solenoid. Examples of electromagnetically operated brake/shifter interlocks are disclosed in U.S. Pat. Nos. 5,018,610, 5,009,295 and 5,167,308, issued May 28, 1991, Apr. 23, 1991 and Dec. 1, 1992 and assigned to Sparton Corporation, General Motors Corporation and Grand Haven Stamped Products Co.

Ignition key retention mechanisms are illustrated in U.S. Pat. Nos. 5,096,033 and 5,129,494, issued Mar. 17, 1992 and Jul. 14, 1992 and assigned to Grand Haven Stamped Products Company and Sparton Corporation.

BRIEF SUMMARY OF THE INVENTION

It is an objective of the present invention to provide an all-electronic, multi-function shifter interlock for automotive vehicles having lever-operated shifters wherein the shift lever is pivotally mounted for transmission range selection and includes a spring biased core rod which forms part of a PARK lock of the detent type. By virtue of the all-electronic nature of the present invention, numerous mechanical components such as cables are eliminated, interlock operating systems are simplified and design/location parameters are liberalized.

In general this objective is achieved through the mounting of an electronic actuator housing on the shift lever for pivotal movement therewith, which housing contains a solenoid or the like which operates on the core rod to inhibit and enable the PARK lock. In the illustrative embodiment herein described, two electromagnetic devices, the first a common solenoid and the second an electromagnet, are mounted on the shift lever and operatively associated with the PARK lock core rod to effectively lock the rod in a predetermined first position whenever certain vehicle system conditions are met. This first position corresponds to a locked or inoperable condition of the PARK lock; i.e., the shift lever release mechanism. Each of the electromagnetic devices is controlled by electrical inputs from an associated vehicle operating system to retract an armature-carried locking pin or bolt to permit axial movement of the shift lever core rod. The solenoid is associated with the ignition system to receive its control signal therefrom and the electromagnet is associated with another vehicle operating system such as the brake system. As a result, the shift lever release mechanism is only operable after two conditions have been satisfied: the ignition key is inserted and turned in the ignition lock and the brake pedal is depressed.

In the illustrative embodiment of the invention, the electromagnetic devices are mounted in a single molded plastic casing which provides an integral pivot for mounting the shift lever on the body of the vehicle. The electromagnetic devices are operatively associated with the shift lever core rod by means of opposed notches in the rod which receive the armature-carried pins or bolts of the devices therein for purposes of inhibiting or preventing longitudinal motion of the core rod along the longitudinal axis of the shift lever. The notch associated with the brake/shifter interlock electromagnet is preferably shaped to provide a preload release function as is described in U.S. Pat. No. 5,176,231, issued Jan. 5, 1993 and assigned to Pontiac Coil, Inc. of Waterford, Mich., the disclosure of said patent being incorporated herein by reference.

In a practical application described herein, the all-electronic shifter interlock preferably comprises a third operating system to effectively retain the ignition key in the ignition lock whenever the vehicle transmission is in a driving gear range; i.e., other than PARK. This is achieved, by example, by locating a normally closed electronic circuit in the same housing with the two electromagnetic devices and effecting a change in a condition of the circuit by means of a follower pin which engages a cam groove in the shift lever core rod whenever the rod is moved to a position which enables shift lever movement out of PARK. The electronic circuit, in turn, is connected to a solenoid of conventional design in the ignition lock which is deenergized to prevent movement of the ignition lock to its LOCK position, the only position in which the key may be removed from the ignition lock cylinder.

BRIEF DESCRIPTION OF THE DRAWING

FIG. 1 is a perspective view of a shift control mechanism incorporating the present invention;

FIG. 6 is a detail of the electronic housing showing the follower pin displaced from the cam groove and the switch tab in the open circuit condition; and FIG. 7 is a schematic diagram of an electrical circuit for an interlock system utilizing the present invention.

DETAILED DESCRIPTION OF THE ILLUSTRATIVE EMBODIMENT

Figure 5:
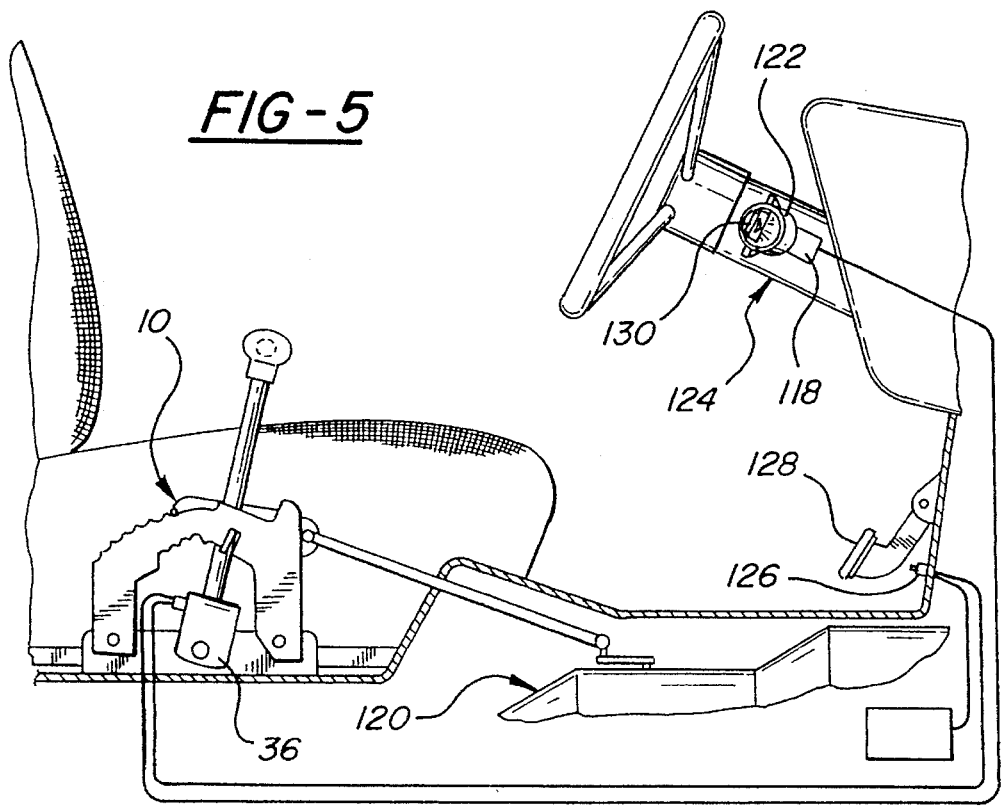
FIG. 5 is a general arrangement diagram of an all-electronic shifter interlock system incorporating the invention.

FIG. 1 illustrates a floor or console-mountable shifter 10 for a vehicle equipped with an automatic transmission (not shown). Shifter 10 comprises a lever 12 which is mounted to a base plate 14 by means of a pivot 16 to permit manual movement of the lever 12 fore-and-aft for the purpose of selecting the operating condition and/or range of the automatic transmission.

Shifter 10 includes a gate bracket 18 which, in conventional fashion, defines a PARK position, a "reverse" position, a "neutral" position, and one or more forward drive positions. The PARK position is defined by a detent 20 and, in conventional fashion, the shift lever 12 is releasably locked in the PARK position by means of a pawl 22 which is welded to an upwardly biased shift lever core rod 24 extending through the center of lever 12 and axially slidable relative thereto. The shift lever 12 is manually released from the PARK position by means of a push button 26 mounted in a T-handle 28 such that depressing the button 26 urges the shift lever core rod 24 downwardly to disengage the pawl 22 from the detent 20. Thereafter the shift lever may be freely pivoted to "reverse", "neutral" or one of the forward drive positions. Shift lever position is communicated to the transmission by a cable 30 having an outer sheath fixed to plate 14 and an axially movable core wire 32 connected to shift lever bracket 34. Depression of push button 26 is also required to return the shift lever 12 to the PARK position as will be apparent to those knowledgeable of shifter construction.

The upper surface of gate bracket 18 is scalloped to cooperate with a spring mounted follower 42 on lever 12 to provide an incremental "feel" for the position of lever 12 relative to the positions represented by the gate configuration on the lower operating surface of bracket 18.

Mounted on and near the bottom end of the shift lever 12 for movement therewith is an electronic actuator housing 36. A saddle bracket 38 welded to the lever 12 has fingers 40 which are held by screws or the like to the housing 36 in four places. Housing 36 provides an integral, cylindrical bushing 70 for pivot pin 16. The mechanisms within the upper, rectangular portion of housing 36 are electrically connectable to remote and diverse vehicle systems to enable and inhibit operation of the shift lever PARK lock as hereinafter described.

Figure 2:
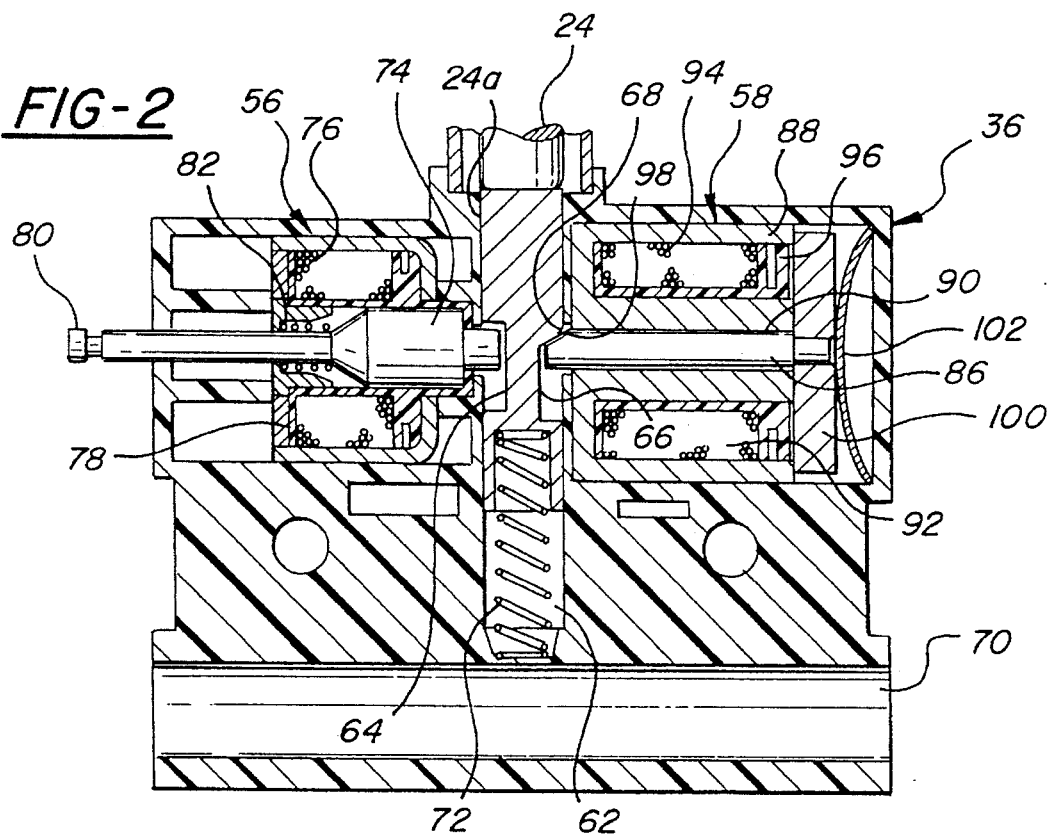
FIG. 2 is a sectional view of the electronic actuator housing with the shifter locked in PARK.

Referring now to FIG. 2, the details of the mechanisms within housing 36 are shown to include a Park/Lock (P/L) solenoid 56 and a Brake/Transmission Shift Interlock (BTSI) electromagnet 58. A blind rod bore 62 is formed in housing 36 to receive a stub shaft 24a, the top surface of which bears against the bottom end surface of the shift lever core rod 24. The core rod 24 and stub shaft 24a move as a unit and, as an alternative construction, can be made integral. Assembly, however, is facilitated by making them independent components. P/L notch 64 and a BTSI notch 66 are formed on opposite sides of shaft 24a. The upper end of BTSI notch 66 has a beveled or rounded transition 68 between the bottom of the notch and the surface of shaft 24a. Spring 72 is positioned in the closed lower end of bore 62 to urge stub shaft 24a and shift lever core rod 24 in an upward direction.

P/L solenoid 56 includes a P/L pin 74, mounted for reciprocating movement along an axis substantially perpendicular to shaft 24a, and a coil 76 of electrically conductive wire, preferably copper, wound about a plastic bobbin 78. P/L pin 74 is retained for sliding motion within bobbin 78 and has an end extension 80 which projects through an opening on housing 36. A bias spring 82 is positioned within bobbin 78 and acts to urge P/L pin 74 to the extended position shown in FIG. 2 in which it engages P/L notch 64. Coil 76 is electrically connected with the vehicle power system by means of electrical connector pins 84.

BTSI electromagnet 58 is mounted on the opposite side of shaft 24a from P/L solenoid 56 and has a BTSI pin 86 which reciprocates along an axis substantially perpendicular to that of shaft 24a. A generally cylindrical ferromagnetic canister 88 is fixed inside housing 36 and has a hole 90 passing through its central axis inside of which BTSI pin 86 is slidably mounted. An annular pocket 92 is formed in canister 88, surrounding and coaxial with hole 90. A coil 94 of electrically conductive wire is wound about an electrically insulating bobbin 96 which fits inside pocket 92. Coil 94 is electrically connected to the vehicle power system by means of electrical connector pins 84. BTSI pin 86 is made of a non-ferrous material and has a first end formed with a bevel 98 and a second end attached to the center of a disk-shaped ferromagnetic armature 100. A leaf spring 102 is trapped between the inner surface of housing 36 and armature 100 and exerts pressure urging armature 100 into contact with canister 88, in which position BTSI pin 86 projects beyond the end of canister 88 and into engagement with BTSI notch 66.

Figure 4:
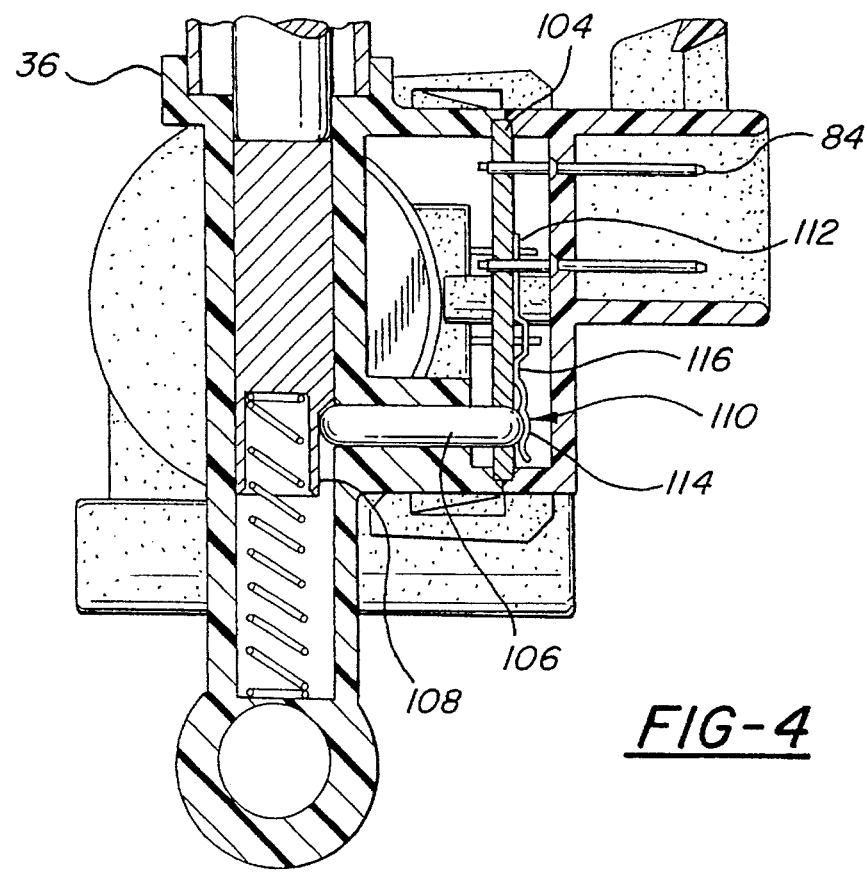
FIG. 4 is another sectional view of the electronic actuator housing showing the cam groove and follower pin components of the key retention mechanism.

As can be seen in FIG. 4, housing 36 also contains a circuit board 104 and a follower pin 106 mode of a non-conductive material. Circuit board 98 lies substantially parallel to the plane formed by shaft 24a, BTSI pin 86, and P/L pin 74, and printed circuit pathways (not shown) are formed thereupon which electrically connect electrical connector pins 84 with coils 76 and 94. Follower pin 106 is supported within housing 36 for reciprocating motion along an axis normal to the plane of circuit board 104 and has a first end which is in contact with a vertically running cam groove 108 formed in the surface of shaft 24a and a second end which projects through a hole in circuit board 104. An electrically conductive switch tab 110 has a first end 112 which is fixed to and makes electrical contact with circuit board 104 and a second end 114 which touches the second end of follower pin 106. Switch tab 110 acts as a spring, pushing on follower pin 106 to hold it in contact with shaft 24a and is bent as shown in FIG. 4 to form a centrally located contact point 116 which touches and makes electrical connection with circuit board 104. Switch tab 110 provides an electrical connection between circuit pathways at first end 112 and at contact point 116 as long as follower pin 106 is seated in cam groove 108. The electrical circuit thus formed selectively energizes and de-energizes a lock cylinder solenoid 118 in the manner to be described below.

Industrial Application

FIG. 5 shows the general arrangement of an all-electronic shifter interlock system in an automobile equipped with an automatic transmission 120 and a floor-mounted shifter 10.

A key-actuated ignition lock 122 shown mounted on an automobile steering column 124 and a brake position switch 126 shown in operative combination with a brake pedal 128 are both electrically connected with electronic actuator housing 36.

Ignition lock 122 is of the type well known in the automotive industry and has at least the following switch positions: "LOCK," in which the vehicle steering wheel is locked against rotation, the ignition key may be inserted into and removed from ignition lock 122, and no electrical power is supplied to most of the vehicle electrical systems; "OFF," in which the steering wheel is unlocked and no vehicle power is supplied; "ON," in which vehicle electrical power is supplied to some vehicle systems including the shift control mechanism circuitry; and "START" in which vehicle electrical power is supplied to the starter motor (not shown) to start the vehicle engine in the conventional manner. Only when ignition lock 122 is in the "Lock" position can an ignition key 130 be inserted into or removed from the lock. A lock cylinder solenoid 118, substantially similar to P/L solenoid 56 in construction and operation, is mounted in operative combination with ignition lock 122 and when de-energized acts in a manner well known to those skilled in the art to prevent ignition lock 122 from being turned to the "LOCK" position.

Referring to FIG. 7, a circuit is shown to provide an interlock between the braking system of a motor vehicle, the ignition switch, the lock cylinder solenoid and the shifter mechanism shown in FIGS. 1–6. In FIG. 7 a 12-volt automotive battery 132 is connected in series with P/L solenoid coil 76 through ignition switch 122. BTSI electromagnet coil 94 and a normally closed brake switch 126 are connected in parallel with P/L solenoid coil 76. Lock cylinder solenoid 118 and switch tab 110 are further connected in series with solenoid coil 76. When ignition switch 122 is closed by moving it to the (ON) position, solenoid coil 76 and electromagnet coil 94 are both energized. Electromagnet coil 94 may then be de-energized by depressing brake pedal 128 to open brake position switch 126. Lock cylinder solenoid 118 is also energized when ignition switch 122 is turned to (ON) and remains energized until switch tab 110 is open circuited by actuation of shift lever 12.

The interlock system as depicted prevents unlocking of the shift lever release mechanism, thereby keeping shift lever 12 in PARK, until two conditions are met: (1) ignition key 130 has been inserted into ignition lock 122 and turned; and (2) the vehicle brake pedal 128 has been depressed. The electrical connection between actuator housing 36 and ignition lock 122 also serves to de-energize lock cylinder solenoid 118 whenever shift lever 12 is out of PARK. When de-energized, lock cylinder solenoid 118 prevents ignition lock 122 from being turned to the LOCK position in which ignition key 130 can be removed.

When the operator first enters the parked vehicle, ignition lock 122 is in the LOCK position and shift lever 12 is in the PARK position. Core spring 72 holds core rod 24 in the shift lock position in which pawl 22 is seated in the PARK detent 20 of bracket 18. Actuators 56,58 are in the state shown in FIG. 2, with bias spring 82 holding P/L pin 74 in the extended position in which it engages P/L notch 64 and thereby inhibits movement of core rod 24 downward to the shift release position. Shift lever 12 is effectively locked in PARK since push button 26 cannot be depressed to disengage pawl 22 from the PARK detent 20.

When the vehicle operator inserts ignition key 130 into ignition lock 122 and switches it from the LOCK to the ON position, vehicle electrical power is applied to coil 76 thereby creating an electromagnetic field which forces P/L pin 74 to a retracted position against the force of bias spring 82. In this retracted position P/L pin 74 is disengaged from P/L notch 64 and so offers no interference to downward movement of core rod 24.

In the event that a malfunction of P/L solenoid 56 or its related circuitry prevents P/L pin 74 from moving to the retracted position when ignition lock 122 is turned to ON, end extension 80 is provided. End extension 80 projects through housing 36 and into a position where it can be accessed by the vehicle operator. By pulling outward on end extension 80 the vehicle operator can disengage P/L pin 74 from P/L notch 64 and so override a faulty P/L solenoid to permit shift lever movement.

Turning ignition switch 122 to ON also energizes BTSI solenoid 58. The resulting application of electric current to coil 94 produces an electromagnetic field which magnetizes canister 88. Armature 100, being made of a ferromagnetic material, is held firmly in contact with the now-magnetized canister 88 so that BTSI pin 86 is maintained in an extended position engaging BTSI notch 66. Thusly, downward movement of core rod 24 to the shift release position continues to be inhibited after ignition lock 122 is switched to ON.

Figure 3:
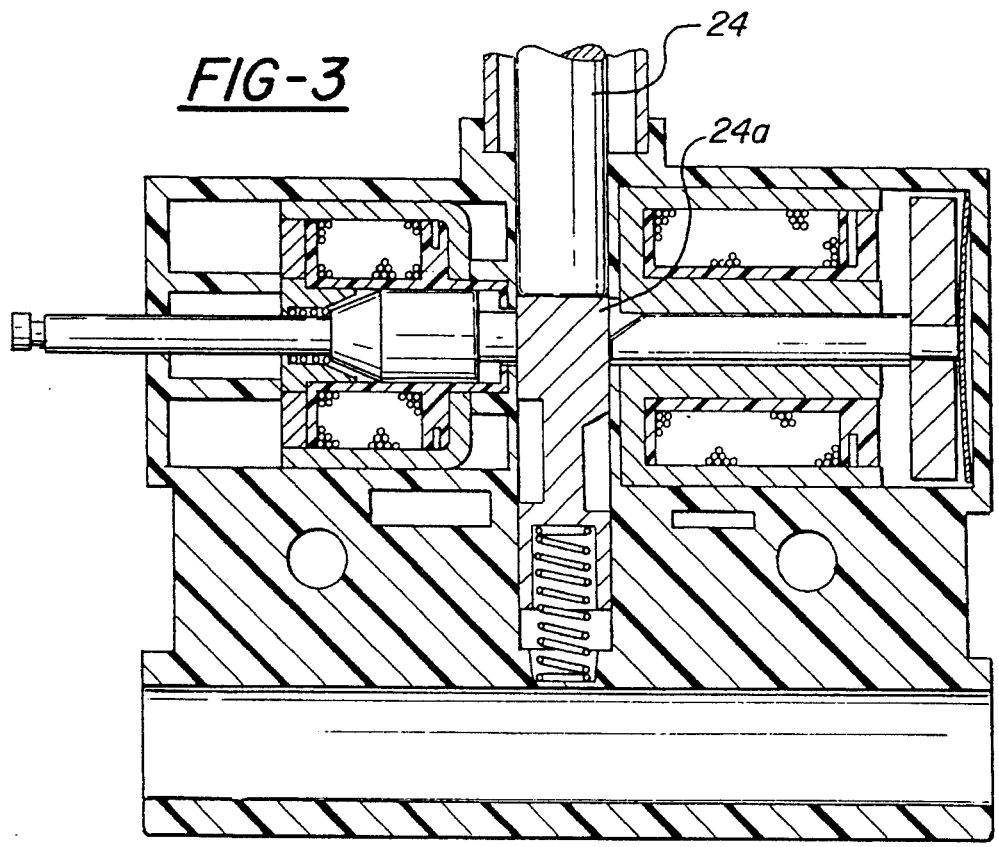
FIG. 3 is a sectional view of the electronic actuator housing with the shift lever release mechanism in the unlocked condition.

When the vehicle operator depresses brake pedal 128, brake position switch 126 is opened to deenergize BTSI solenoid 58. The electromagnetic force holding BTSI pin 86 in its extended position is removed, thus unlocking the shift lever release mechanism. When push button 26 is depressed a downward force is applied to core rod 24 and as core rod 24 moves downward away from the shift inhibit position the sliding interaction between transition 68 and bevel 98 results in BTSI pin 86 being forced to a retracted position against the force of leaf spring 102. The resulting condition of the mechanism is shown in FIG. 3. In the preferred embodiment of the invention, transition 68 and bevel 98 are shaped so that if the vehicle operator is pressing on push button 26 at the time coil 94 is deenergized by brake application, the downward force being applied to core rod 24 will not result in binding between BTSI notch 66 and BTSI pin 86 that may prevent movement of pin 86 to its retracted position. This preload release geometry is described in detail in U.S. Pat. No. 5,176,231, issued Jan. 5, 1993 and assigned to Pontiac Coil, Inc. of Waterford, Mich., the disclosure of said patent being incorporated herein by reference.

Once core rod 24 is depressed and pawl 22 is disengaged from PARK detent 20, shift lever 12 may be rotated about pivot 16 to shift transmission 120 out of PARK. Because PARK detent 20 is of a greater depth than of the other gear position notches formed in gate bracket 18, the configuration shown in FIG. 2 can only occur when shift lever 12 is in the PARK position. In all other gear positions, core rod 24 is held in a depressed position (as shown in FIG. 3) so that neither of the electromagnetic devices can achieve a locking engagement with their respective notches. Thusly, the interlock system may function only with respect to PARK and not the other positions of shift lever 12. The vehicle operator need not depress brake pedal 128 to make any gear change other than out of PARK.

When core rod 24 is pushed downward as part of the gear shift sequence, follower pin 106 is forced to ride up and out of cam groove 108. This motion of follower pin 106 (to the right as shown in FIG. 4) deflects switch tab 110 away from circuit board 104 so that contact point 116 is no longer in circuit-forming contact with circuit board 104 (see FIG. 6). This open circuit condition causes lock cylinder solenoid 118 to become de-energized, in which state it prevents ignition lock 122 from being turned to the "Lock" position. Since LOCK is the only position in which ignition key 130 can be removed from ignition lock 122, this system effectively prevents removal of the key whenever shift lever 12 is moved out of PARK.

It will be appreciated that the drawings and descriptions contained herein are merely meant to illustrate a particular embodiment of the present invention and are not meant to be limitations upon the practice thereof, as numerous variations will occur to persons of skill in the art. For example, any automotive system capable of producing an appropriate electrical signal; e.g., a seat belt switch or a seat occupancy switch, may be connected with the interlock module.

We claim:

1. An electronic shifter interlock for an automotive vehicle having a shift lever which is pivotally mounted for transmission operating mode selection and which includes a spring-biased, axially movable core rod forming part of a detent-type PARK lock wherein the interlock further comprises:

an electromagnetic actuator housing fixedly mounted on the shift lever for pivotal movement therewith; and an electromagnetic actuator within the housing and operatively engaging the core rod to alternatively inhibit and enable operation of the PARK lock.

2. An interlock as defined in claim 1 wherein the actuator includes a movable pin extending into mechanically interfering relationship with the core rod, and an electromagnetic winding for positioning the pin according to the condition of a remote mechanism.

3. An interlock as defined in claim 2 wherein the remote mechanism is an ignition lock.

4. An interlock as defined in claim 2 wherein the remote mechanism is a vehicle brake system.

5. An electronic shifter interlock system for an automotive vehicle having a lever-operated shifter of the type having a release mechanism which must be actuated before the shift lever can be effectively operated, comprising:

a shift lever mounted for pivotal movement between a PARK position and a series of drive positions;

a core rod and a stub shaft mounted within said lever for axial reciprocal motion between a shift lock position and a shift release position, the stub shaft having first and second notches formed therein;

a first electromagnetic device having a normally extended bolt engaging the first notch to inhibit axial movement of the rod away from the shift lock position but energizable to retract said bolt to enable movement of the rod to the shift release position;

a second electromagnetic device having a movable bolt held in engagement with the second notch to inhibit axial movement of the rod away from the shift lock position only when the second electromagnetic device is energized;

the first electromagnetic device being operatively connected to a vehicle ignition system to be energized only when the ignition system is activated; and the second electromagnetic device being operatively connected to another vehicle system to be energized only when a predetermined condition in said system is satisfied.

6. A system as defined in claim 5 further including bias means for urging the core rod toward the shift lock position.

7. A system as defined in claim 5 wherein said another vehicle system is a brake system and the predetermined condition is the depression of a brake pedal.

8. A system as defined in claim 5 wherein the ignition system comprises an ignition lock for receiving and holding an ignition key and a key lock means electrically actuable to prevent removal of the key, the system further including means operable in response to axial movement of the core rod to activate the key lock means.

9. A system as defined in claim 8 wherein the means responsive to axial movement of the core rod comprises a cam groove formed in the stub shaft, a follower engaging the groove and electrical switch means operable by movement of the follower to change the condition of an electrical circuit controlling the key lock means.

10. A system as defined in claim 5 further comprising a housing, the first and second electromagnetic devices being mounted in the housing on opposite sides of the core rod.

11. A system as defined in claim 10 wherein the housing is mechanically connected to the shift lever for movement therewith about a pivot point.

12. A system as defined in claim 11 wherein the housing includes integral pivot means adapted to be connected to the structure of an automotive vehicle.

13. A system as defined in claim 5 wherein the second notch is shaped to provide preload release.

* * * * *